US012165614B2

(12) United States Patent
Wang

(10) Patent No.: US 12,165,614 B2
(45) Date of Patent: Dec. 10, 2024

(54) DRIVING METHOD FOR DISPLAY PANEL, BRIGHTNESS COMPENSATION DEVICE, AND DISPLAY DEVICE

(71) Applicant: TCL CHINA STAR OPTOELECTRONICS TECHNOLOGY CO., LTD., Guangdong (CN)

(72) Inventor: Haokai Wang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/523,720

(22) Filed: Nov. 29, 2023

(65) Prior Publication Data

US 2024/0312435 A1 Sep. 19, 2024

(30) Foreign Application Priority Data

Mar. 17, 2023 (CN) ......................... 202310275622.4

(51) Int. Cl.
*G09G 5/00* (2006.01)
*G09G 5/10* (2006.01)

(52) U.S. Cl.
CPC ....... *G09G 5/10* (2013.01); *G09G 2320/0233* (2013.01); *G09G 2320/0247* (2013.01); *G09G 2320/0271* (2013.01); *G09G 2360/16* (2013.01)

(58) Field of Classification Search
CPC ....... G09G 2310/08; G09G 2320/0233; G09G 2320/0247; G09G 2340/0435; G09G 2360/16; G09G 3/2007; G09G 5/005
See application file for complete search history.

(56) References Cited

U.S. PATENT DOCUMENTS

2015/0116195 A1* 4/2015 Yokonuma ........... G09G 3/3406 345/102
2022/0277705 A1* 9/2022 Higuchi ............... G09G 3/3696

* cited by examiner

*Primary Examiner* — Insa Sadio
(74) *Attorney, Agent, or Firm* — PV IP PC; Wei Te Chung

(57) ABSTRACT

A driving method for a display panel includes: obtaining a change range of a refresh frequency difference of the display panel within a preset duration; obtaining a current refresh frequency of the display panel in response to determining that an upper limit of the change range of the refresh frequency difference is less than a preset refresh frequency difference; obtaining a number of display frames in response to determining that the current refresh frequency of the display panel is less than a reference refresh frequency; and performing brightness compensation on the display panel in response to determining that the number of display frames is greater than or equal to a preset number of frames.

16 Claims, 5 Drawing Sheets

DRIVING METHOD FOR DISPLAY PANEL, BRIGHTNESS COMPENSATION DEVICE, AND DISPLAY DEVICE

CROSS-REFERENCE TO RELATED APPLICATION

This application claims the priority to Chinese Application No. 202310275622.4, filed on Mar. 17, 2023, the disclosure of which is incorporated herein by reference in its entirety.

FIELD

The present disclosure relates to display technologies, and more particularly, to a driving method for a display panel, a brightness compensation device, and a display device.

BACKGROUND

In general, a display tends to be fixed at a certain refresh frequency during operation, such as a most common frequency of 60 Hz. Under certain specific conditions, it is often necessary for the display to display at a higher refresh frequency. Display frequency conversion technology may enable a built-in core graphics card and an acceleration processor to directly and dynamically control the refresh frequency of the display to which the display is connected. For a display with the display frequency conversion, charging time for each frame at a highest refresh frequency and charging time for each frame at a lowest refresh frequency are same, with a difference that blank time between two frames at a highest refresh frequency and blank time between two frames at a lowest refresh frequency are different. Because there is long duration per frame at a low refresh frequency, the blank time increases with respect to a high refresh frequency. Too long blank time will aggravate an effect of panel leakage, eventually causing a decrease of overall brightness of a panel.

Since the display switches back and forth between different refresh frequencies in a short time, a brightness difference at different refresh frequencies causes a panel to flicker seriously. Brightness compensation at different refresh frequencies can be achieved for the panel by adjusting a voltage of a power management integrated circuit. The compensation method includes sending different compensation data by a timing controller, and taking a last group of data received in each blank time as a compensation value. However, due to output problems of different graphics cards, when the frequency is fixed, a part of frequency points at a frequency band boundary fluctuate back and forth, and received compensation data changes, thereby causing fixed frequency flicker phenomenon.

Therefore, there is a need for a driving method for a display panel that can improve a flicker problem caused by voltage adjustment in a fixed frequency mode.

SUMMARY

According to one or more embodiments of the present disclosure, a driving method for a display panel includes: acquiring a change range of a refresh frequency difference of the display panel within a preset duration; acquiring a current refresh frequency of the display panel, in response to determining that an upper limit value of the change range of the refresh frequency difference is less than a preset refresh frequency difference; acquiring a corresponding number of display frames, in response to determining that the current refresh frequency of the display panel is less than a reference refresh frequency; and performing a brightness compensation on the display panel, in response to determining that the corresponding number of display frames is greater than or equal to a preset number of frames.

Optionally, in some embodiments of the present disclosure, the acquiring of the change range of the refresh frequency difference of the display panel within a preset duration, and the acquiring of the current refresh frequency of the display panel, in response to determining that the upper limit value of the change range of the refresh frequency difference is less than the preset refresh frequency difference include: acquiring a plurality of refresh frequencies of a plurality of display frames of the display panel within the preset duration; calculating a difference of the plurality of refresh frequencies to obtain a change range of the refresh frequency difference; acquiring an upper limit value of the change range of the refresh frequency difference; determining whether the upper limit value is less than the preset refresh frequency difference; and acquiring the current refresh frequency of the display panel, in response to determining that the upper limit value is less than the preset refresh frequency difference.

Optionally, in some embodiments of the present disclosure, the performing of the brightness compensation on the display panel, in response to determining that the corresponding number of display frames is greater than or equal to the preset number of frames includes: acquiring the brightness compensation value corresponding to a refresh frequency range to which the current refresh frequency of the display panel belongs, in response to determining that the corresponding number of display frames is greater than or equal to the preset number of frames; and performing the brightness compensation on the display panel based on the brightness compensation value.

Optionally, in some embodiments of the present disclosure, the acquiring of the brightness compensation value corresponding to a refresh frequency range to which the current refresh frequency of the display panel belongs, in response to determining that the corresponding number of display frames is greater than or equal to the preset number of frames, and the performing of the brightness compensation on the display panel based on the brightness compensation value include: acquiring a plurality of display brightness values of the display panel corresponding to the plurality of refresh frequency values, respectively; acquiring a corresponding brightness difference between the reference brightness value and each of the multiple display brightness values respectively based on the reference brightness value of the display panel and the plurality of display brightness values of the display panel corresponding to the plurality of refresh frequency values; acquiring a corresponding brightness compensation value based on the brightness differences; dividing the change range of the refresh frequency into a preset number of refresh frequency ranges; and establishing a correspondence between each of the refresh frequency ranges and a corresponding brightness compensation value.

Optionally, in some embodiments of the present disclosure, the driving method further includes maintaining a current brightness of the display panel unchanged in response to determining that the corresponding number of display frames is less than the preset number of frames.

Optionally, in some embodiments of the present disclosure, a range of the preset refresh frequency difference includes 0 Hz to 5 Hz.

Optionally, in some embodiments of the present disclosure, a range of the reference refresh frequency includes 55 Hz to 65 Hz.

Optionally, in some embodiments of the present disclosure, a range of the preset number of frames includes 10 frames to 15 frames.

According to one or more embodiments of the present disclosure, a brightness compensation device performs brightness compensation on a display panel by using the driving method for the display panel as described above. The brightness compensation device includes a detection module and a brightness compensation module. The detection module is configured to detect a change range of a refresh frequency difference within a preset duration, and further configured to acquire a current refresh frequency of the display panel and a corresponding number of display frames with the current refresh frequency. The brightness compensation module is configured to perform a brightness compensation on the display panel in response to determining that the change range of the refresh frequency difference, the current refresh frequency of the display panel, and the corresponding number of display frames with the current refresh frequency meet a brightness compensation condition.

According to one or more embodiments of the present disclosure, a display device includes the brightness compensation device as described above.

DETAILED DESCRIPTION

Some embodiments of the present disclosure will be described in detail below with reference to the accompanying drawings. The embodiments are described for illustrative purposes only and are not intended to limit the scope of the present disclosure.

A method for driving a display panel, a brightness compensation device, and a display device according to one or more embodiments of the present disclosure can improve a flicker problem caused by a voltage adjustment in a fixed frequency mode and improve display quality. Detailed descriptions are given below. It should be noted that an order in which following examples are described is not intended to limit a preferred order of embodiments. Additionally, in the description herein, a term "including" means "including, but not limited to."

In order to solve a brightness flicker problem caused by switching between high and low frequencies, compensation is performed by compensating different power supply management integrated circuit voltages in different frequency bands from a highest refresh frequency to a lowest refresh frequency. Due to fluctuations in an output of a graphics card or test screens of special scenes, the refresh frequency of the screen may fluctuate within a small range even under fixed frequency conditions.

Specifically, a compensation mode of the power supply management integrated circuit voltage to a frequency point is compensating in divided frequencies. A group number of communication data received in a same frequency band is same. In response to determining that the refresh frequency fluctuates at an edge of the frequency band in a fixed frequency case, the refresh frequency switches back and forth between two frequency bands, and the group number of communication data received also changes constantly. In this case, corresponding effective gamma voltage values change, and brightness of the panel also fluctuates accordingly to form a visible flicker. According to one or more embodiments of the present disclosure, a driving method for a display panel is intended to solve a flicker problem of a display panel caused by a voltage adjustment (a change in screen brightness in a case of switching between different refresh frequencies caused by a decrease in the screen brightness since blank time increases in a low frequency) in the fixed frequency mode (a small-range refresh frequency fluctuation due to output of a graphics card and a special scene).

It should be noted that sizes of sequence numbers of steps in one or more embodiments do not imply an order in which the steps are performed. The order in which the steps are performed should be determined by function and internal logic thereof, but should not constitute any limitation on an implementation of one or more embodiments of the present disclosure.

Figure 1:
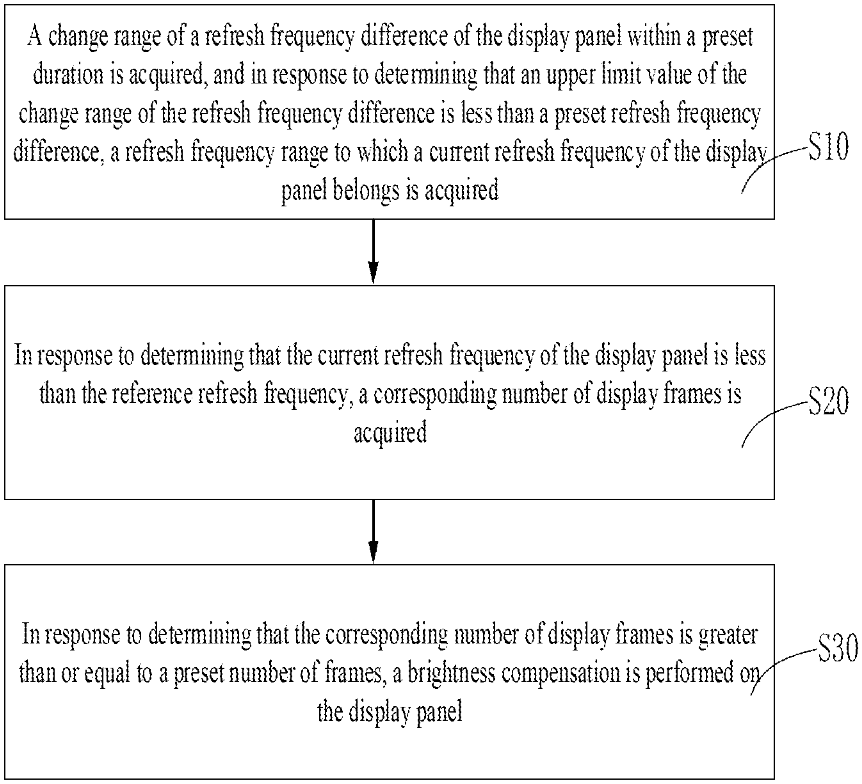
FIG. 1 is a schematic flow chart of a driving method for a display panel according to one or more embodiments of the present disclosure.

Referring to FIG. 1, FIG. 1 is a first kind of schematic flow chart of a method for driving a display panel according to one or more embodiments of the present disclosure. As shown in FIG. 1, according to one or more embodiments of the present disclosure, a driving method for a display panel includes steps S10, S20 and S30.

At step S10, a change range of a refresh frequency difference of the display panel within a preset duration is acquired. In response to determining that an upper limit value of the change range of the refresh frequency difference is less than a preset refresh frequency difference, a refresh frequency range to which a current refresh frequency of the display panel belongs is acquired.

In one or more embodiments of the present disclosure, the change range of the refresh frequency difference of the display panel within the preset duration is acquired. That is, multiple display frames are acquired and played in the display panel for the preset duration, the refresh frequency of the display panel is detected in real time, and the change range of the refresh frequency is acquired. For example, the change range of the refresh frequency includes 9 change ranges of the refresh frequency from 48 Hz to 144 Hz, which are [48, 58), [58, 68), [68, 78), [78, 88), [88, 98), [98,108), [108, 118), [118,128), and [128,144), respectively. Actual brightness values corresponding to all change ranges of the refresh frequency are 197.6 cd/m$^2$, 198.3 cd/m$^2$, 199.2 cd/m$^2$, 199.8 cd/m$^2$, 200.5 cd/m$^2$, 201.7 cd/m$^2$, and 202.2 cd/m$^2$, respectively. Brightness differences corresponding to all change ranges of the refresh frequency are 2.4 cd/m$^2$, 1.7 cd/m$^2$, 1.3 cd/m$^2$, 0.8 cd/m$^2$, 0.5 cd/m$^2$, 1.1 cd/m$^2$, 1.7 cd/m$^2$, and 2.2 cd/m$^2$, respectively. [88, 98) is a reference refresh frequency range and 199.8 cd/m$^2$ is a reference brightness value. It should be noted that above specific values are only specific examples given in one or more embodiments, and may be set based on specific type and parameter of the display panel and specific refresh frequency range in actual application.

In one or more embodiments of the present disclosure, a range of the preset refresh frequency difference includes 0 Hz to 5 Hz. For example, the preset refresh frequency difference is 3 Hz. That is, a difference between an upper limit value and a lower limit value in the refresh frequency range is less than or equal to 5 Hertz. For example, the change range of the refresh frequency is [45, 50), then a corresponding refresh frequency difference is 5 Hertz. In response to determining that the refresh frequency difference is 5 Hz, a condition that the upper limit value of the change range of the refresh frequency difference is less than the preset refresh frequency difference in the present disclosure is met.

At step S20, in response to determining that the current refresh frequency of the display panel is less than the reference refresh frequency, a corresponding number of display frames is acquired.

In one or more embodiments of the present disclosure, the reference refresh frequency is a dividing line that divides the high frequency and the low frequency. A range of the reference refresh frequency includes 55 Hz to 65 Hz. For example, the reference refresh frequency value is 60 Hz. For example, in response to determining that the upper limit value in the refresh frequency range to which the current refresh frequency belongs is 50 Hz, the number of display frames corresponding to a case where the upper limit value of the refresh frequency is 50 Hz and the lower limit value of the refresh frequency is greater than or equal to 45 Hz is acquired. For another example, in response to determining that the upper limit value in the refresh frequency range to which the current refresh frequency belongs is 48 Hz, the number of display frames corresponding to a case where the upper limit value of the refresh frequency is 48 Hz and the lower limit value of the refresh frequency is greater than or equal to 43 Hz is obtained.

At step S30, in response to determining that the corresponding number of display frames is greater than or equal to a preset number of frames, a brightness compensation is performed on the display panel.

In one or more embodiments of the present disclosure, a range of the preset number of frames includes 10 frames to 15 frames. For example, in response to determining that a corresponding number of display frames lasts 10 frames to 15 frames in a case where the upper limit value in the refresh frequency range is 50 Hz and the lower limit value in the refresh frequency range is greater than or equal to 45 Hz, a brightness compensation is performed on the display panel.

In one or more embodiments of the present disclosure, the preset number of frames may also range from 5 frames to 20 frames. For example, in response to determining that the corresponding number of display frames lasts 5 frames to 20 frames in a case where the upper limit value in the refresh frequency range is 40 Hz and the lower limit value in the refresh frequency range is greater than or equal to 35 Hz, a brightness compensation is performed on the display panel.

A driving method for a display panel according to the present disclosure includes: acquiring the change range of the refresh frequency difference of the display panel within the preset duration; acquiring the current refresh frequency of the display panel, in response to determining that the upper limit value of the change range of the refresh frequency difference is less than the preset refresh frequency difference; acquiring a corresponding number of display frames, in response to determining that the current refresh frequency of the display panel is less than the reference refresh frequency; and performing a brightness compensation on the display panel, in response to determining that the corresponding number of display frames is greater than or equal to the preset number of frames. The driving method for the display panel according to the present disclosure can improve a flicker problem caused by voltage adjustment in the fixed frequency mode and improve display quality.

Figure 2:
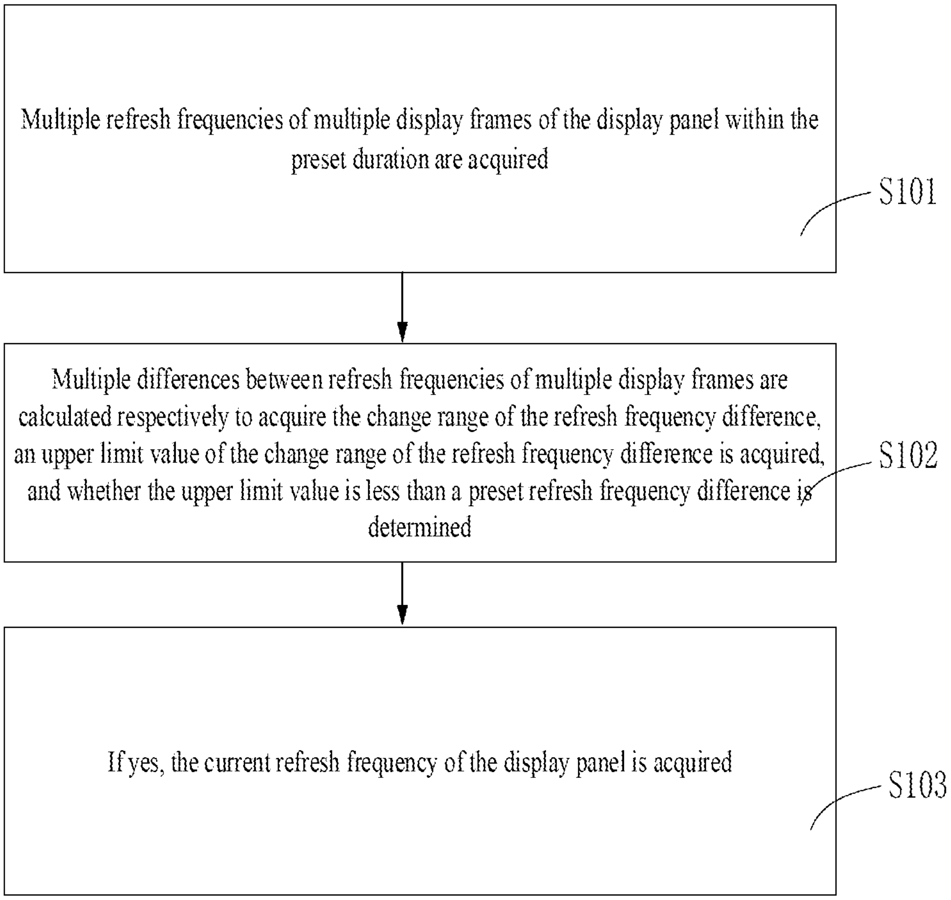
FIG. 2 is a schematic flow chart of step S10 in FIG. 1.

Referring to FIG. 2, FIG. 2 is a schematic flow chart of step S10 in FIG. 1. As shown in FIG. 2, step S10 specifically includes steps S101, S102 and S103.

At step S101, multiple refresh frequencies of multiple display frames of the display panel within the preset duration are acquired.

In one or more embodiments of the present disclosure, the refresh frequencies are detected in real time when the display panel plays multiple display frames, and multiple refresh frequency values are acquired.

In one or more embodiments of the present disclosure, although the refresh frequency of the display signal is constantly changing, the refresh frequency of the display signal always changes regularly within a fixed range. By detecting a maximum refresh frequency and a minimum refresh frequency of transmission of the display signal, the change range of the refresh frequency of the display panel can be obtained.

At step S102, multiple differences between refresh frequencies of multiple display frames are calculated respectively to acquire the change range of the refresh frequency difference. The upper limit value of the change range of the refresh frequency difference is acquired, and whether the upper limit value is less than a preset refresh frequency difference is determined.

For example, the change range of the refresh frequency is [45, 50), and a corresponding refresh frequency difference is 5 Hz. The change range of the refresh frequency is [48, 50), the corresponding refresh frequency difference is 2 Hz, and the upper limit value of the change range of the refresh frequency difference is 5 Hz. In response to determining that the upper limit value of the change range of the refresh frequency difference is 5 Hz, a condition that the upper limit value of the change range of the refresh frequency difference is less than the preset refresh frequency difference in the present disclosure is met.

At step S103, if yes, the current refresh frequency of the display panel is acquired.

Specifically, if each refresh frequency difference is less than the preset refresh frequency difference, it is determined that the current display panel is in a fixed frequency mode. In this case, the current refresh frequency is detected, and it is determined whether the current refresh frequency is less than 60 Hz. Further, since the refresh frequency fluctuates slightly in the fixed frequency mode, a refresh frequency range corresponding to an upper limit value and a lower limit value of a current refresh frequency fluctuation is acquired. For example, in response to determining that the upper limit value and the lower limit value of the current refresh frequency fluctuation are 49.5 Hz and 48.5 Hz, respectively, the refresh frequency range to which the current refresh frequency belongs is [48, 58), actual brightness corresponding to the refresh frequency range is 197.6 cd/m$^2$, and brightness difference corresponding to the refresh frequency range is 2.4 cd/m$^2$.

Figure 3:
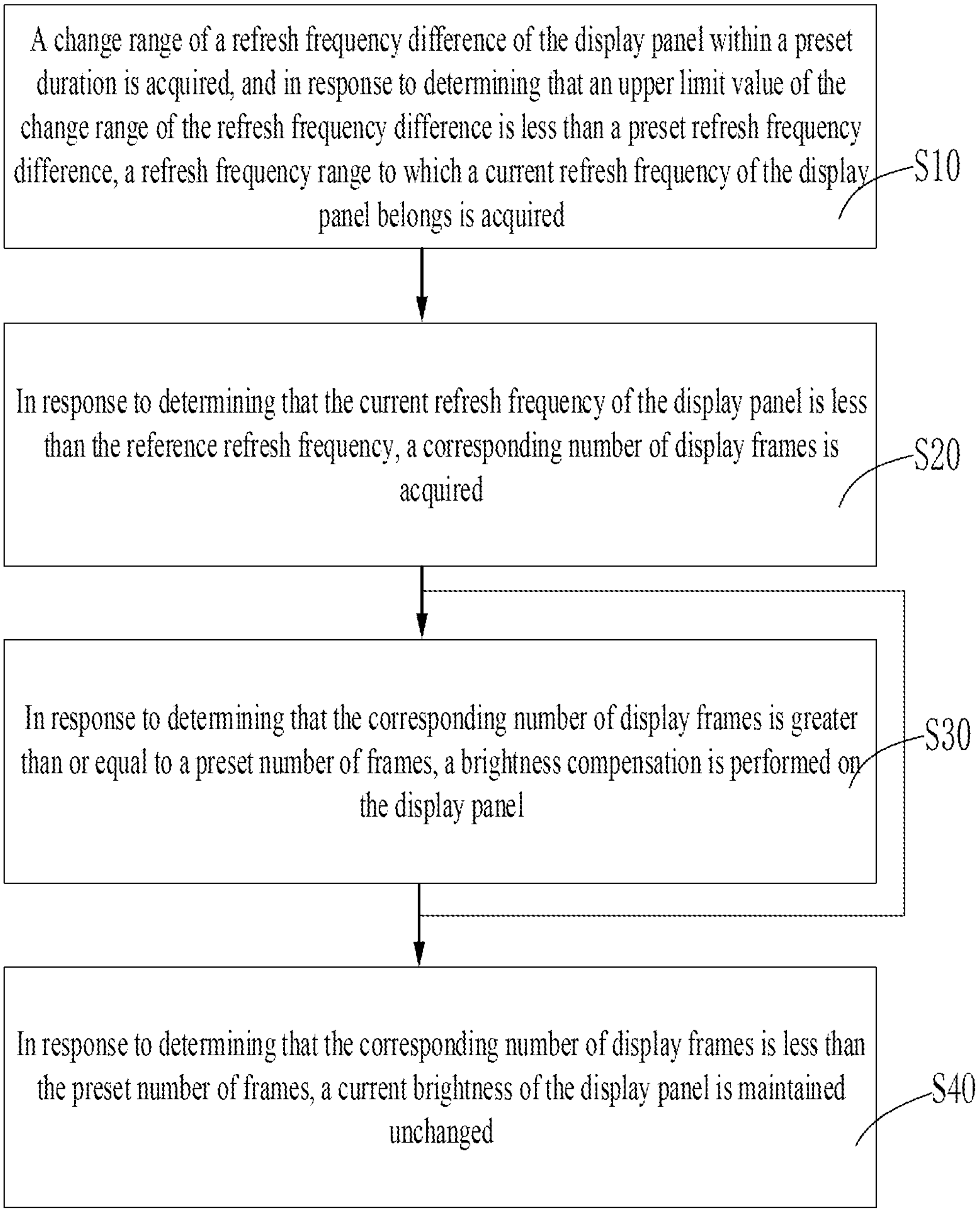
FIG. 3 is a schematic flow chart of another driving method for a display panel according to one or more embodiments of the present disclosure.

Referring to FIG. 3, FIG. 3 is a second kind of flow chart of a driving method for a display panel according to one or more embodiments of the present disclosure. As shown in FIG. 3, the display panel driving method further includes step S40.

At step S40, in response to determining that the corresponding number of display frames is less than the preset number of frames, a current brightness of the display panel is maintained unchanged.

In one or more embodiments of the present disclosure, in response to determining that the lower limit value of the refresh frequency range to which the current refresh frequency of the display panel belongs is greater than or equal to an upper limit value of the reference refresh frequency range, a driving voltage compensation function is turned off, and a current brightness of the display panel is maintained unchanged.

Specifically, the driving method for the display panel further includes steps S10, S20, and S30, specific contents thereof are same as those in FIG. 1. Therefore, details are not described herein.

In one or more embodiments of the present disclosure, in response to determining that the corresponding number of display frames is greater than or equal to the preset number of frames, a brightness compensation value corresponding to the refresh frequency range is acquired based on the refresh frequency range to which the current refresh frequency of the display panel belongs. The brightness of the display panel is compensated based on the brightness compensation value.

Figure 4:
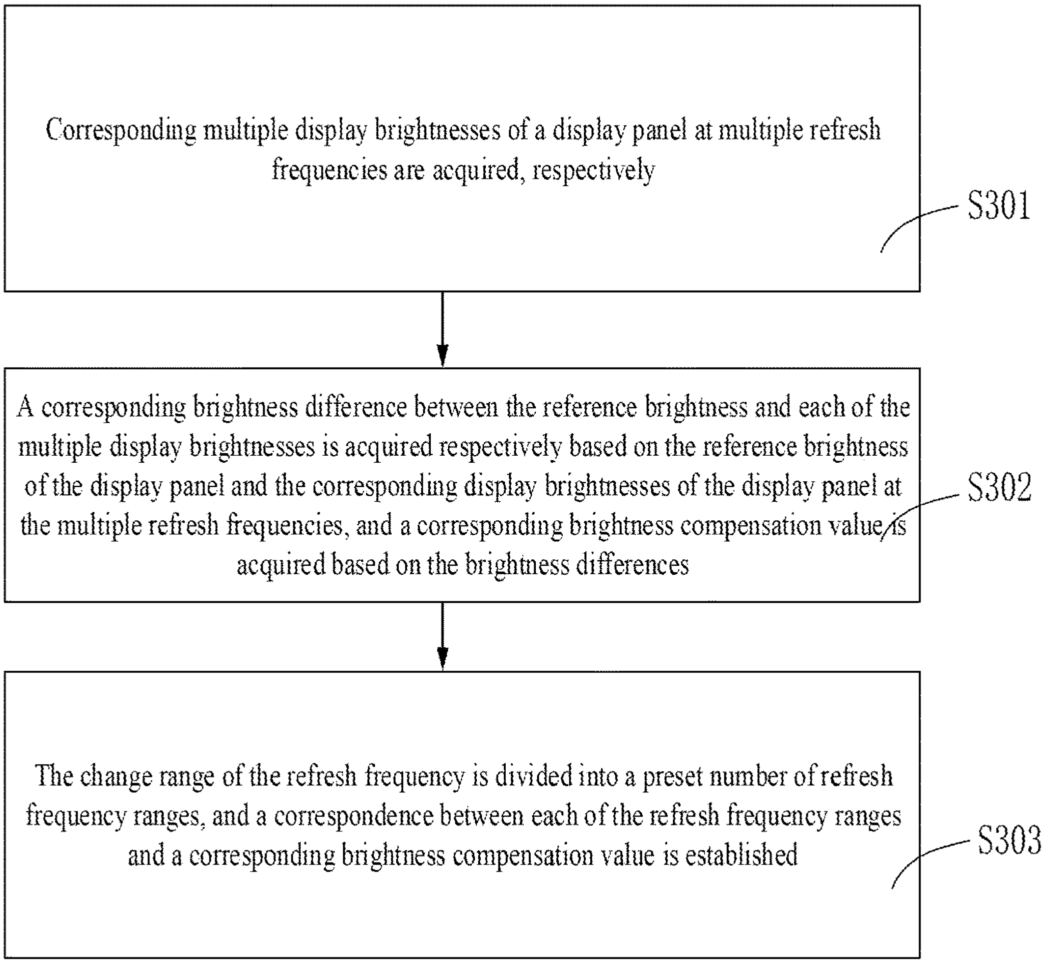
FIG. 4 is a schematic flow chart of step S30 in FIG. 1.

Referring to FIG. 4, FIG. 4 is a flow chart of step S30 in FIG. 1. As shown in FIG. 4, step S30 specifically includes steps S301, S302 and S303.

At step S301, corresponding multiple display brightness values of the display panel at multiple refresh frequencies are acquired, respectively.

At step S302, a corresponding brightness difference between the reference brightness value and each of the multiple display brightness values is acquired respectively based on the reference brightness value of the display panel and the corresponding display brightness values of the display panel at the multiple refresh frequencies, and a corresponding brightness compensation value is acquired based on the brightness differences.

Specifically, the brightness difference corresponding to the refresh frequency range to which the current refresh frequency belongs is acquired. The brightness of the display panel is adjusted to be a sum of the current brightness of the display panel and the brightness difference.

At step S303, the change range of the refresh frequency is divided into a preset number of refresh frequency ranges. The preset number of refresh frequency ranges include the reference frequency range. A correspondence between each of the refresh frequency ranges and a corresponding brightness compensation value is established.

In one or more embodiments of the present disclosure, the brightness difference corresponding to the reference refresh frequency range is 0.

In one or more embodiments of the present disclosure, the brightness when the display panel is connected to display signals with different refresh frequencies may be obtained by a brightness meter, another device having a brightness detection function, or by a software algorithm.

In one or more embodiments of the present disclosure, a reference brightness value of the display panel is a brightness displayed when the display is connected to a display signal with the reference refresh frequency. When the refresh frequency of the display signal fluctuates slightly around the reference refresh frequency, the reference brightness value of the display does not change significantly. Therefore, it may be considered that when the refresh frequency of the display signal is within a reference refresh frequency range, the brightness of the display panel is always the reference brightness value. The brightness difference corresponding to the display signals with different refresh frequencies is a difference between the brightness of the display panel when connected to display signals with different refresh frequencies and the reference brightness value.

In one or more embodiments of the present disclosure, based on a stepwise progressive relationship between the actual brightness of the display panel and the refresh frequency of the display signal, the change range of the refresh frequency may be divided into a preset number of refresh frequency ranges, that is, an actual brightness and a brightness difference corresponding to a same refresh frequency range are same. Since the actual brightness of the display is the reference brightness value when the refresh frequency of the display signal is within the reference refresh frequency range, a brightness difference corresponding to the reference refresh frequency range is 0.

In one or more embodiments of the present disclosure, a correspondence relationship between each refresh frequency range and a corresponding brightness difference may be a mapping relationship, may exist in a form of a correspondence relationship table or a display look-up table, and also may be implemented by using other data tables or a storage medium of random storage memory type having a same function as a display look-up table, such as searching for corresponding output data based on input data.

In one or more embodiments of the present disclosure, if the corresponding number of display frames is less than the preset number of frames, the driving voltage compensation function is maintained turned off. The current brightness of the display panel is maintained unchanged.

In the driving method for the display panel according to one or more embodiments of the present disclosure, by turning off the brightness compensation function is in the fixed frequency mode, there is no driving voltage jump and no flicker phenomenon. Only when it is determined that current refresh frequencies of a preset number of consecutive display frames are all less than the reference refresh frequency range, the brightness compensation function is turned on, so as to improve the flicker problem in the low frequency state.

Figure 5:
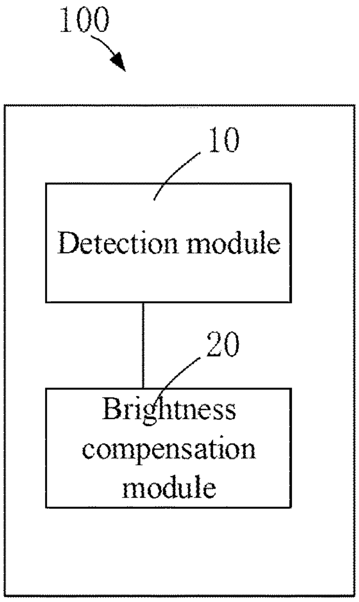
FIG. 5 is a schematic block diagram of a brightness compensation device according to one or more embodiments of the present disclosure.
Figure 6:
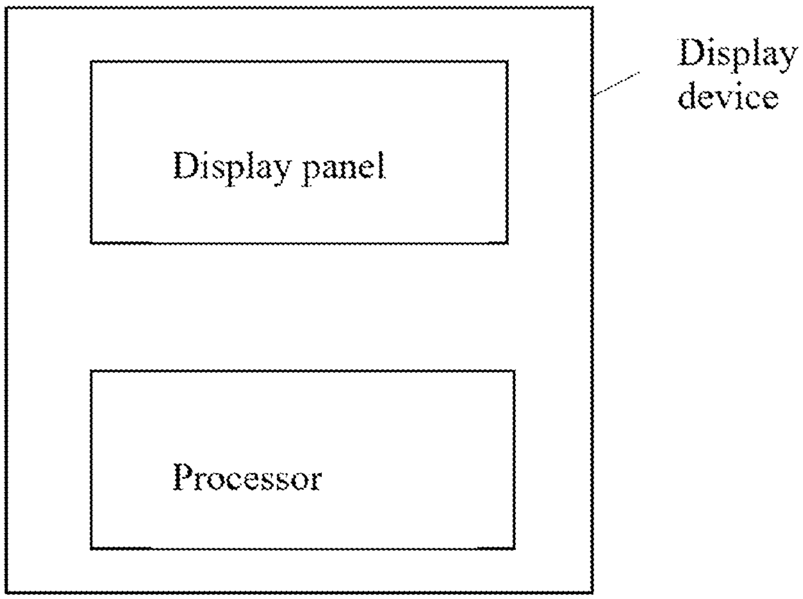
FIG. 6 is a schematic block diagram of a display device according to one or more embodiments of the present disclosure.

On the other hand, referring to FIG. 5, FIG. 5 is a structural schematic diagram of a brightness compensation device according to one or more embodiments of the present disclosure. As shown in FIG. 5, a brightness compensation device 100 according to one or more embodiments of the present disclosure performs a brightness compensation on a display panel by using the display panel driving method described above. The display device includes a detection module 10 and a brightness compensation module 20. The detection module 10 is configured to detect a change range of a refresh frequency difference within a preset duration, and further configured to acquire a current refresh frequency of the display panel and a corresponding number of display frames with the current refresh frequency. The brightness compensation module 20 is configured to perform a brightness compensation on the display panel in response to determining that the change range of the refresh frequency difference, the current refresh frequency of the display panel, and the corresponding number of display frames with the current refresh frequency meet a brightness compensation condition.

A display device according to one or more embodiments of the present disclosure includes the brightness compensation device described above. The brightness compensation device is applied to a display device based on display frequency conversion technology, and may also be applied to various display apparatuses including the display device based on the display frequency conversion technology and a computing device connected to the display device based on the display frequency conversion technology, for example, an advertising machine, a large-scale multimedia display screen, a television, a PC (Personal Computer) client, a server, and the like. The brightness compensation device may be a processor of the display device.

Specifically, the display device may be an LCD (Liquid Crystal Display), an OLED (Organic Electroluminesence Display), an QLED (Quantum Dot Light Emitting Diode), a curved surface display device, or the like.

Specifically, the processor may be a Central Processing Unit (CPU), or may be another general purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, or the like. The general purpose processor may be a microprocessor or the processor, and also may be any conventional processor or the like.

The present disclosure is directed to a driving method for a display panel and a display device. The driving method for the display panel includes: acquiring a change range of a refresh frequency difference of the display panel within a preset duration; acquiring a current refresh frequency of the display panel, in response to determining that it is determined that an upper limit value of the change range of the refresh frequency difference is less than a preset refresh frequency difference; acquiring a corresponding number of display frames, in response to determining that the current refresh frequency of the display panel is less than a reference refresh frequency; and performing a brightness compensation on the display panel, in response to determining that the corresponding number of display frames is greater than or equal to a preset number of frames. The driving method for the display panel according to the present disclosure can improve a flicker problem caused by voltage adjustment in the fixed frequency mode and improve the display quality.

The foregoing describes in detail a driving method for a display panel, a brightness compensation device, and a display device according to one or more embodiments of the present disclosure. A specific example is used to describe principles and embodiments of the present disclosure. The description of the above embodiments is merely used for helping understand the method of the present disclosure and the core idea thereof. At the same time, variations will occur to those skilled in the art in both the detailed description and the scope of application in accordance with ideas of the present disclosure. In summary, the present description should not be construed as limiting the present disclosure.

What is claimed is:

1. A driving method for a display panel, comprising:

obtaining a change range of a refresh frequency difference of the display panel within a preset duration;

obtaining a current refresh frequency of the display panel in response to determining that an upper limit of the change range of the refresh frequency difference is less than a preset refresh frequency difference;

obtaining a number of display frames in response to determining that the current refresh frequency of the display panel is less than a reference refresh frequency; and performing brightness compensation on the display panel in response to determining that the number of display frames is greater than or equal to a preset number of frames.

2. The driving method for the display panel according to claim 1, wherein the obtaining of the change range of the refresh frequency difference of the display panel within the preset duration comprises:

obtaining a plurality of refresh frequencies of a plurality of display frames of the display panel within the preset duration; and calculating a difference between every two ones of the plurality of refresh frequencies to obtain the change range of the refresh frequency difference; and the obtaining of the current refresh frequency of the display panel in response to determining that the upper limit of the change range of the refresh frequency difference is less than the preset refresh frequency difference comprises:

obtaining the upper limit of the change range of the refresh frequency difference;

determining whether the upper limit is less than the preset refresh frequency difference; and obtaining the current refresh frequency of the display panel in response to determining that the upper limit is less than the preset refresh frequency difference.

3. The driving method for the display panel according to claim 1, wherein the performing of the brightness compensation on the display panel in response to determining that the number of display frames is greater than or equal to the preset number of frames comprises:

obtaining a brightness compensation value corresponding to a refresh frequency range to which the current refresh frequency of the display panel belongs in response to determining that the number of display frames is greater than or equal to the preset number of frames; and performing the brightness compensation on the display panel according to the brightness compensation value.

4. The driving method for the display panel according to claim 3, wherein the obtaining of the brightness compensation value corresponding to the refresh frequency range to which the current refresh frequency of the display panel belongs comprises:

obtaining a plurality of display brightness values of the display panel corresponding to a plurality of refresh frequency values, respectively;

calculating a difference between a reference brightness value of the display panel and each of the plurality of display brightness values to obtain a plurality of brightness differences;

obtaining a plurality of brightness compensation values according to the plurality of brightness differences;

dividing the refresh frequency change range into a preset number of refresh frequency ranges;

establishing a correspondence between each of the refresh frequency ranges and one of the brightness compensation values; and obtaining, based on the correspondence, one of the brightness compensation values corresponding to one of the refresh frequency ranges to which the current refresh frequency of the display panel belongs.

5. The driving method for the display panel according to claim 1, further comprising:

maintaining current brightness of the display panel in response to determining that the number of display frames is less than the preset number of frames.

6. The driving method for the display panel according to claim 1, wherein the preset refresh frequency difference ranges from 0 Hz to 5 Hz.

7. The driving method for the display panel according to claim 1, wherein the reference refresh frequency ranges from 55 Hz to 65 Hz.

8. The driving method for the display panel according to claim 1, wherein the preset number of frames ranges from 10 frames to 15 frames.

9. A display device, comprising:

a display panel; and a processor configured to perform operations comprising:

obtaining a change range of a refresh frequency difference of the display panel within a preset duration;

obtaining a current refresh frequency of the display panel in response to determining that an upper limit of the change range of the refresh frequency difference is less than a preset refresh frequency difference;

obtaining a number of display frames in response to determining that the current refresh frequency of the display panel is less than a reference refresh frequency; and performing brightness compensation on the display panel in response to determining that the number of display frames is greater than or equal to a preset number of frames.

10. The display device according to claim 9, wherein the obtaining of the change range of the refresh frequency difference of the display panel within the preset duration comprises:

obtaining a plurality of refresh frequencies of a plurality of display frames of the display panel within the preset duration; and calculating a difference between every two ones of the plurality of refresh frequencies to obtain the change range of the refresh frequency difference; and the obtaining of the current refresh frequency of the display panel in response to determining that the upper limit of the change range of the refresh frequency difference is less than the preset refresh frequency difference comprises:

obtaining the upper limit of the change range of the refresh frequency difference;

determining whether the upper limit is less than the preset refresh frequency difference; and obtaining the current refresh frequency of the display panel in response to determining that the upper limit is less than the preset refresh frequency difference.

11. The display device according to claim 9, wherein the performing of the brightness compensation on the display panel in response to determining that the number of display frames is greater than or equal to the preset number of frames comprises:

obtaining a brightness compensation value corresponding to a refresh frequency range to which the current refresh frequency of the display panel belongs in response to determining that the number of display frames is greater than or equal to the preset number of frames; and performing the brightness compensation on the display panel according to the brightness compensation value.

12. The display device according to claim 11, wherein the obtaining of the brightness compensation value corresponding to the refresh frequency range to which the current refresh frequency of the display panel belongs comprises:

obtaining a plurality of display brightness values of the display panel corresponding to a plurality of refresh frequency values, respectively;

calculating a difference between a reference brightness value of the display panel and each of the plurality of display brightness values to obtain a plurality of brightness differences;

obtaining a plurality of brightness compensation values according to the plurality of brightness differences;

dividing the refresh frequency change range into a preset number of refresh frequency ranges;

establishing a correspondence between each of the refresh frequency ranges and one of the brightness compensation values; and obtaining, based on the correspondence, one of the brightness compensation values corresponding to one of the refresh frequency ranges to which the current refresh frequency of the display panel belongs.

13. The display device according to claim 9, further comprising:

maintaining current brightness of the display panel in response to determining that the number of display frames is less than the preset number of frames.

14. The display device according to claim 9, wherein the preset refresh frequency difference ranges from 0 Hz to 5 Hz.

15. The display device according to claim 9, wherein the reference refresh frequency ranges from 55 Hz to 65 Hz.

16. The display device according to claim 9, wherein the preset number of frames ranges from 10 frames to 15 frames.

* * * * *